Patented Nov. 6, 1923.

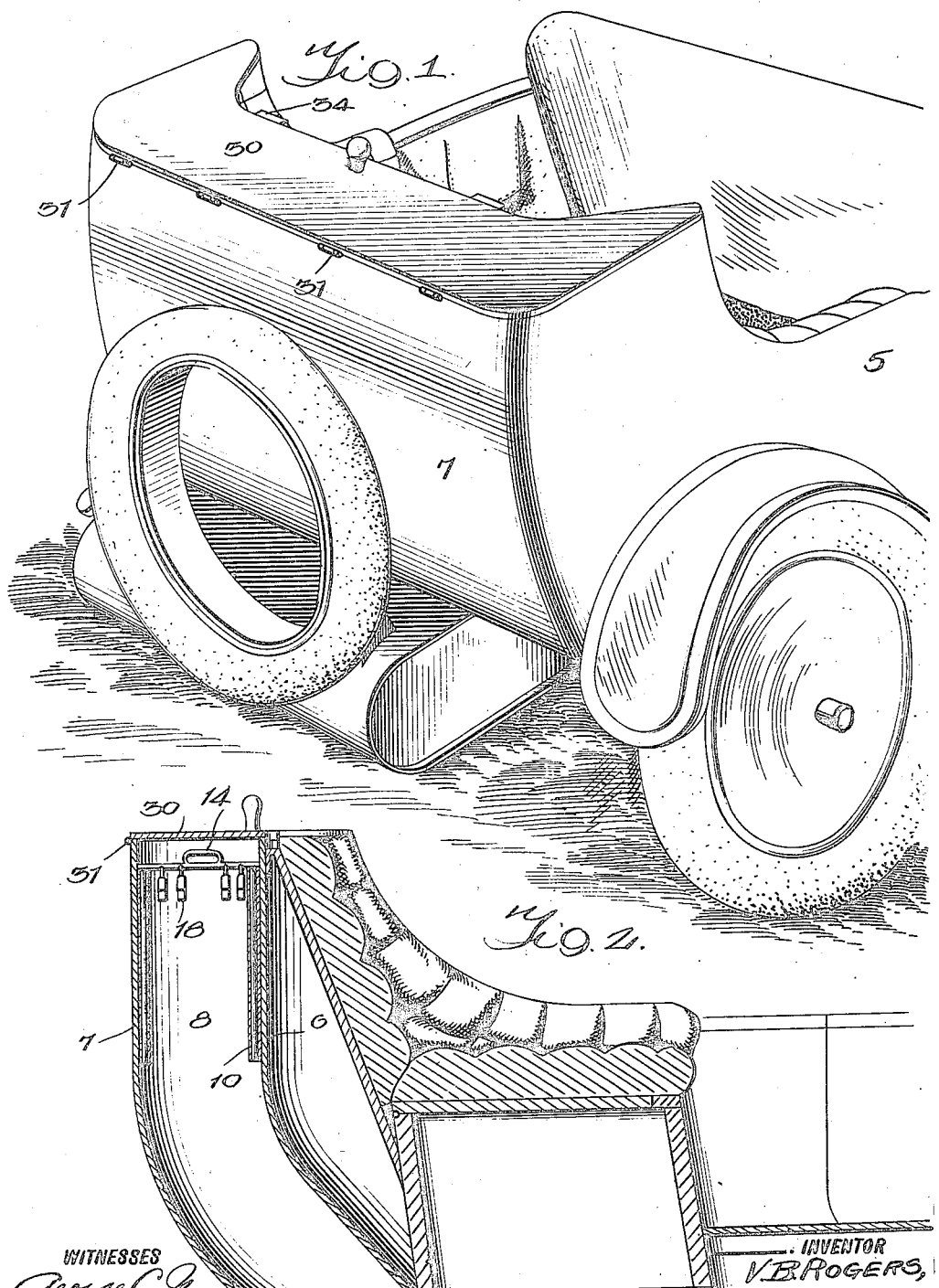

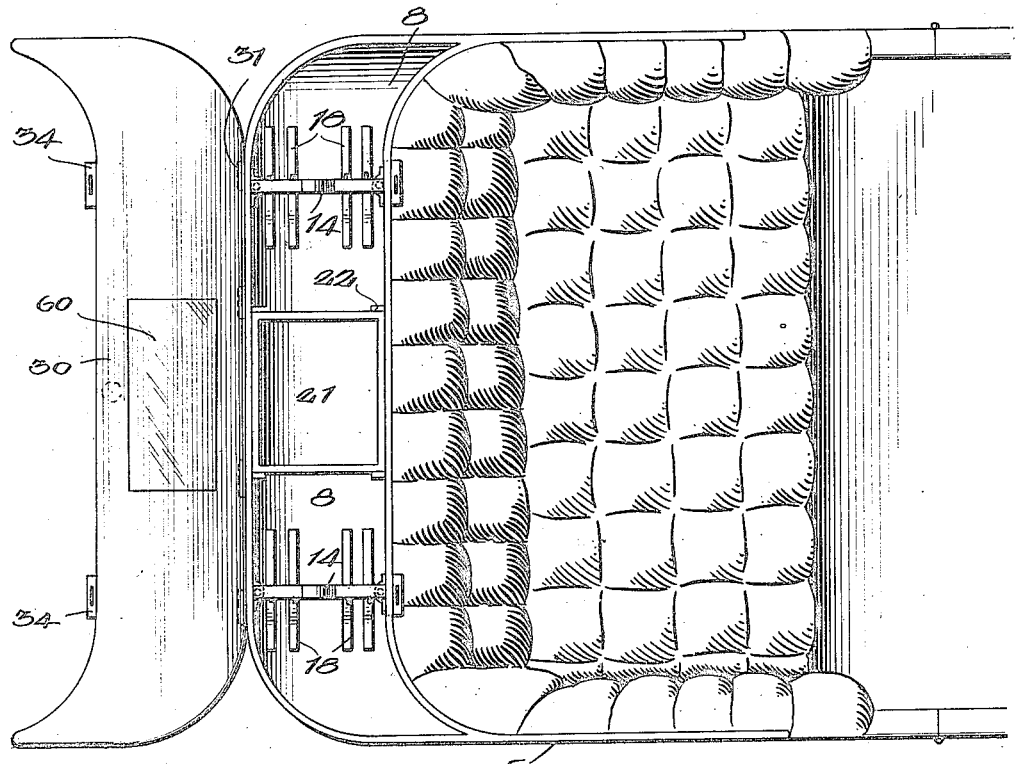
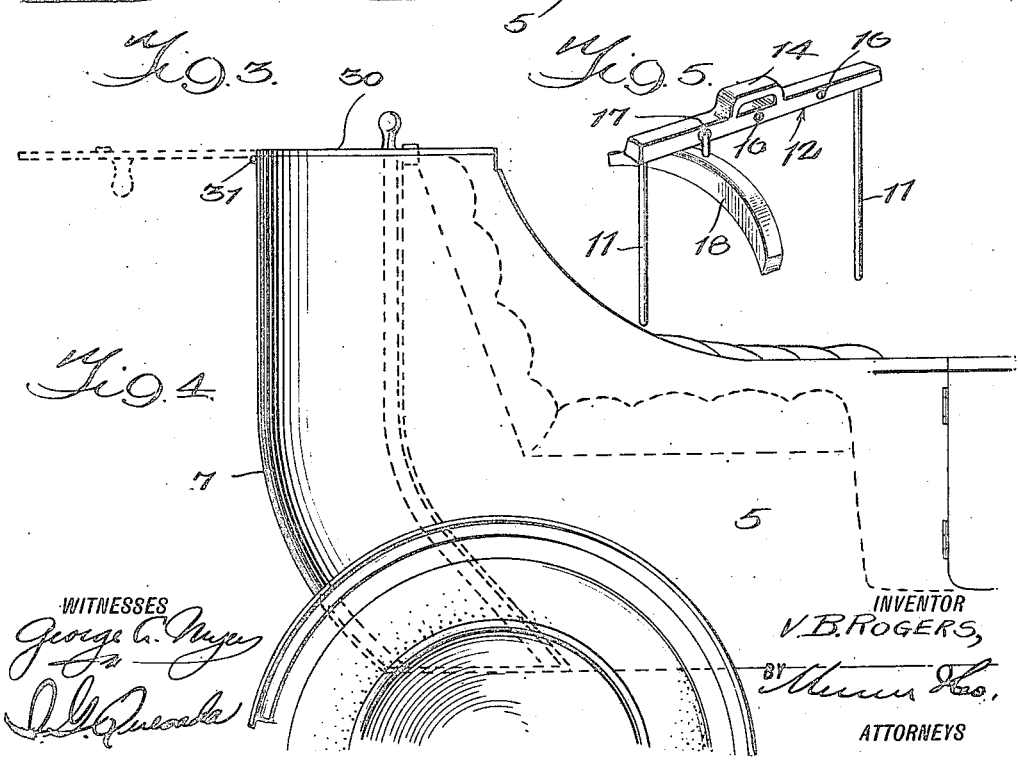

1,473,161

UNITED STATES PATENT OFFICE.

VERNA BOSTON ROGERS, OF CANUTILLO, TEXAS.

CLOTHES CONTAINER.

Application filed December 14, 1922. Serial No. 606,906.

*To all whom it may concern:*

Be it known that I, VERNA B. ROGERS, a citizen of the United States, and resident of Canutillo, in the county of El Paso and State of Texas, have invented certain new and useful Improvements in Clothes Containers, of which the following is a specification.

This invention relates to automobile bodies and more particularly to a body having a compartment adapted to receive clothes and other articles.

Briefly stated an important object of this invention is to provide an automobile body having its rear end provided with a compartment which is accessible through the top of the body and which is of ample capacity to carry a quantity of clothes or other articles without creasing the same.

A further object of the invention is to provide a vehicle body having a compartment of the class described wherein the clothes hanger supports are in the form of U's and are provided with simple means whereby the same may be detachably supported.

A further object is to provide a vehicle body of the class described which is of highly simplified construction, durable in use and cheap to manufacture.

Other objects and advantages will be apparent during the course of the following description.

In the accompanying drawings forming a part of this application and in which like numerals are employed to designate like parts throughout the same, Figure 1 is a fragmentary perspective of a vehicle body constructed in accordance with this invention, Figure 2 is a central vertical sectional view illustrating the compartment.

Figure 3 is a fragmentary plan view of a vehicle body constructed in accordance with this invention, the top of the compartment being shown open, Figure 4 is a fragmentary side elevation of the vehicle body, Figure 5 is a perspective of a clothes hanger support embodied in the invention.

In the drawings wherein for the purpose of illustration is shown a preferred embodiment of the invention the numeral 5 designates a vehicle body which is stamped into the proper shape in the usual manner and which is provided with spaced backs 6 and 7 which as illustrated in Figure 2 define a transversely extending compartment 8. Attention is directed to the fact that the spaced backs 6 and 7 define a compartment extending entirely across the back of the vehicle and consequently a large quantity of articles may be carried. Also the addition of the improved compartment 8 does not add substantially to the size of the vehicle and does not in any way mar the appearance of the vehicle.

In carrying out the invention the backs 6 and 7 are provided in their opposed sides with vertical tubular guides 10 which receive the attaching stems 11 of the U-shaped clothes hanger supports 12.

As illustrated in Figure 5 the clothes hanger supports 12 are formed with connecting portions having handles 14 by means of which the U-shaped members may be placed in position and removed.

It will be seen that the bight or connecting portion of each U-shaped member 12 is provided with a series of spaced openings 16 for the reception of the attaching hooks 17 of clothes hangers 18. By extending the hooks 17 through the clothes hangers 18, the clothes hangers cannot move longitudinally on the connecting portions of the U-shaped members and consequently the clothes supported on the hangers are held in proper position and cannot move as the result of vibration of the vehicle.

Figure 3 illustrates that between the rows of clothes hangers an article carrying receptacle 21 is arranged and this article carrying receptacle is supported for sliding movement by means of guide flanges 22. It might be stated that the article carrying receptacle 21 which is slidable in the compartment divides the compartment into two chambers and holds the garments supported by the clothes hangers against excessive lateral movement.

The compartment is of course provided with a cover plate 30 hinged as indicated at 31 and provided along its free edge with a lock 34 by means of which the cover may be securely held in position. It will be seen that the cover fits snugly upon the top of the compartment and therefore effectively excludes dust, rain and other undesirable elements, all of which contributes to the desirability of the invention.

The inventive idea involved in this application may be carried out in connection with automobiles, motor cycle side cars, Pullman train cars, motor cars, motor boats, aeroplanes, trains, depots and the like. If desired the lock may be controlled by a coin operated mechanism of any approved style.

The top 30 is provided with a mirror 60 which when the top is elevated provides a means whereby the occupants of the vehicle may make their toilet.

Having thus described the invention, what is claimed is:—

1. The combination of a vehicle body having its rear end provided with spaced backs defining a transversely extending compartment, pairs of tubular guides secured to the opposed sides of said backs, and U-shaped supports having attaching stems snugly received within said guides, the connecting portions of said U-shaped supports being formed with openings to receive the attaching hooks of clothes hangers.

2. The combination of a vehicle body having its rear end provided with spaced backs defining a transversely extending compartment, pairs of tubular guides secured to the opposed sides of said backs, U-shaped supports having attaching stems snugly received within said guides, the connecting portions of said U-shaped supports being formed with openings to receive the attaching hooks of clothes hangers, and a top hinged to said body and adapted to extend over said compartment.

3. A vehicle body comprising spaced backs defining a compartment extending entirely across the body of the vehicle, tubular guides secured to the opposite sides of said backs and terminating below the upper edges of the same, U-shaped members having attaching stems received within said tubular guides having bight portions formed with openings to receive the attaching hooks of coat hangers whereby the coat hangers are held against sliding movement on the connecting portion, the bight portions of said U-shaped members also being provided with handles by means of which the U-shaped members, the coat hangers and the garments carried thereby may be elevated.

4. A vehicle body comprising spaced backs defining a compartment extending entirely across the body of the vehicle, tubular guides secured to the opposite sides of said backs and terminating below the upper edges of the same, U-shaped members having attaching stems received within said tubular guides having bight portions formed with openings to receive the attaching hooks of coat hangers whereby the coat hangers are held against sliding movement on the connecting portion, the bight portions of said U-shaped members also being provided with handles by means of which the U-shaped members, the coat hangers and the garments carried thereby may be elevated, and a cover adapted to extend over said compartment.

5. A vehicle comprising a body having spaced backs merged together at their ends thereby defining a compartment, a pair of U-shaped supports arranged in spaced relation to said compartment and having attaching means, coat hangers carried by said supports and arranged in spaced rows, a receptacle arranged between said rows of coat hangers and constituting a means to hold garments supported by the coat hangers against excessive lateral movement, and a cover adapted to close said compartment.

Mrs. VERNA BOSTON ROGERS.